(12) United States Patent
Youssefifar

(10) Patent No.: US 7,478,840 B2
(45) Date of Patent: Jan. 20, 2009

(54) PIPE COUPLINGS

(75) Inventor: Fatollah Youssefifar, Cheadle (GB)

(73) Assignee: Cable Management Products Limited (GB)

( * ) Notice: Subject to any disclaimer, the term of this patent is extended or adjusted under 35 U.S.C. 154(b) by 0 days.

(21) Appl. No.: 10/052,356

(22) Filed: Jan. 23, 2002

(65) Prior Publication Data

US 2002/0096883 A1    Jul. 25, 2002

(30) Foreign Application Priority Data

Jan. 23, 2001   (GB)   .................. 0101927.2
Jun. 9, 2001    (GB)   .................. 0114055.7

(51) Int. Cl.
*F16L 39/00*    (2006.01)

(52) U.S. Cl. ........................ 285/319; 285/55

(58) Field of Classification Search ............. 285/903, 285/55, 260, 305, 319, 345, 422, 423, 344, 285/379, 380, 293.1, 285.1, 45, 910, 915
See application file for complete search history.

(56) References Cited

U.S. PATENT DOCUMENTS

| | | | | |
|---|---|---|---|---|
| 1,817,774 A | * | 8/1931 | Sipe | ............................ 285/231 |
| 2,899,216 A | * | 8/1959 | Brock | ............................ 285/7 |
| 3,718,571 A | * | 2/1973 | Bidwell | ................. 204/196.15 |
| 3,998,478 A | * | 12/1976 | Zopfi | .......................... 277/607 |
| 4,923,227 A | | 5/1990 | Petty et al. | |
| 5,406,983 A | * | 4/1995 | Chambers et al. | ........... 138/109 |
| 5,588,682 A | * | 12/1996 | Breese | ........................ 285/52 |
| 5,607,190 A | | 3/1997 | Exandier et al. | |
| 5,799,986 A | * | 9/1998 | Corbett et al. | ................. 285/55 |
| 5,884,943 A | | 3/1999 | Katzer et al. | |
| 5,980,670 A | * | 11/1999 | Andre | ..................... 285/293.1 |
| 6,012,743 A | | 1/2000 | Godeau et al. | |
| 6,129,121 A | * | 10/2000 | Kohle | .......................... 138/143 |
| 6,186,558 B1 | * | 2/2001 | Komolrochanaporn | ...... 285/423 |
| 6,349,980 B1 | * | 2/2002 | Schwarz et al. | ............. 285/379 |
| 6,478,341 B1 | * | 11/2002 | Miyajima et al. | ........... 285/253 |

FOREIGN PATENT DOCUMENTS

| | | | | |
|---|---|---|---|---|
| EP | 0275749 A1 | * | 7/1988 | |
| EP | 1048884 A2 | | 11/2000 | |
| GB | 2172356 A | * | 9/1986 | .................. 285/55 |
| GB | 2225550 A | | 6/1990 | |

* cited by examiner

*Primary Examiner*—Aaron M Dunwoody
(74) *Attorney, Agent, or Firm*—DLA Piper LLP (US)

(57) ABSTRACT

A coupling for a corrugated conduit has a housing of a rigid plastics material with two resilient spring catches on opposite sides to engage between corrugations on the conduit. A layer of a softer, elastomeric material is continuously joined on both the interior and exterior of the housing. On the interior, the softer material extends on a tapering surface to diametrically seal with a range of conduits. On the exterior, the layer of softer material forms both a flange on an annular ledge to seal with a cooperating coupling and manual gripping regions.

13 Claims, 2 Drawing Sheets

PIPE COUPLINGS

CROSS-REFERENCE TO RELATED APPLICATIONS

This application claims priority of British Patent Application No. 0114055.7, filed Jun. 9, 2001 and British Patent Application No. 0101927.2, filed Jan. 23, 2001.

TECHNICAL FIELD

This disclosure relates to pipe couplings and assemblies.

BACKGROUND

Connection to a corrugated pipe or conduit can be made by means of a coupling in which the end of the pipe is inserted, the coupling having a retaining member in the form of a resilient tooth that engages between corrugations to prevent the pipe and coupling being pulled apart after assembly. The coupling may have a tapering bore forming a close fit with the outside of the pipe so as to seal the pipe with the coupling. Couplings of this kind are described, for example, in U.S. Pat. Nos. 5,094,482, 5,041,256, GB2225550, U.S. Pat. Nos. 5,150,930 and 4,923,227 and are sold by Adaptaflex Limited of Coleshill, Birmingham, UK. Although the seal provided by these couplings is satisfactory in many situations, there are some applications where a more effective seal is needed.

SUMMARY

Described herein is a coupling for a pipe, the coupling including a housing and retaining means for retaining the pipe within the housing, the housing having a bore therein, the coupling being of a relatively rigid plastics material and having a layer of a relatively deformable material continuously molded onto at least a part of both its inner and outer surfaces.

The layer on the inner surface is preferably adapted to form a seal with the outside of the pipe and may provide a tapering surface. The retaining means is preferably formed integrally with the housing and may include at least one resilient catch member adapted to engage a projection on the pipe. The pipe may have a corrugated external surface, the catch member being adapted to engage between the corrugations. The layer on the outer surface may include a part formed on an external ledge of the housing to provide a seal with a cooperating member and, or alternatively, it may include a part that provides a manual gripping region. The layer on the inner and outer surfaces is preferably continuous with one another. The deformable material may be an elastomeric material.

Also described herein is an assembly of a corrugated pipe and a coupling according to the above one aspect.

A method of forming a coupling is also described, the method including the steps of injecting a first material of a relatively hard plastics material to form a housing of the coupling with integral retaining means and subsequently injecting a second, softer material to form a continuous layer on the harder material both on the inside and outside of the housing.

Still further described herein is a coupling made by the above method.

A coupling, an assembly of the coupling on a conduit and a method of forming the coupling will now be described, by way of example, with reference to the accompanying drawings.

DETAILED DESCRIPTION

The assembly comprises a conduit 1 and a coupling 2 fitted on the forward, left-hand end 10 of the conduit.

The conduit 1 is entirely conventional and is of a rigid but bendable plastics material with a circular section and has corrugations 11 on its external and internal surfaces. The left-hand end 10 of the conduit 1 is cut square.

Figure 1:
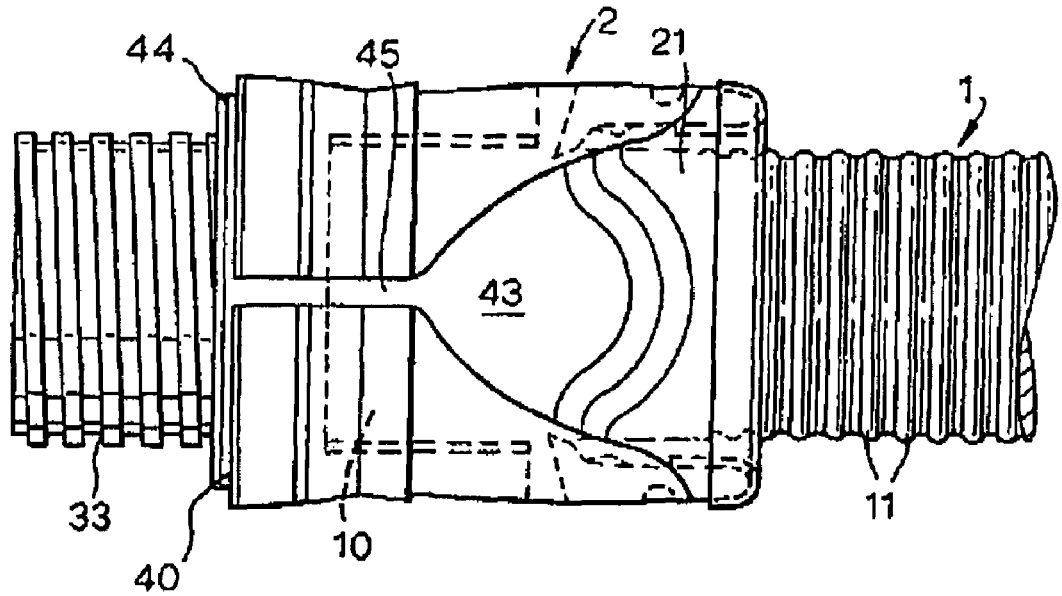
FIG. 1 is a side elevation view of the assembly of coupling and conduit.
Figure 2:
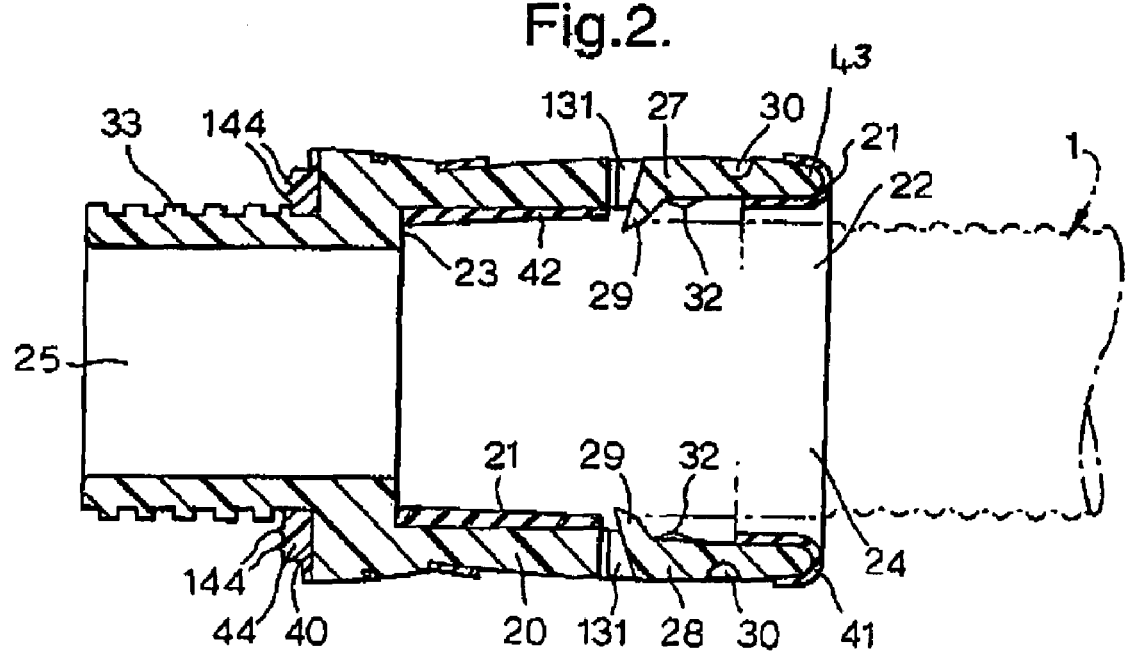
FIG. 2 is a sectional side elevation view of the coupling.
Figure 3:
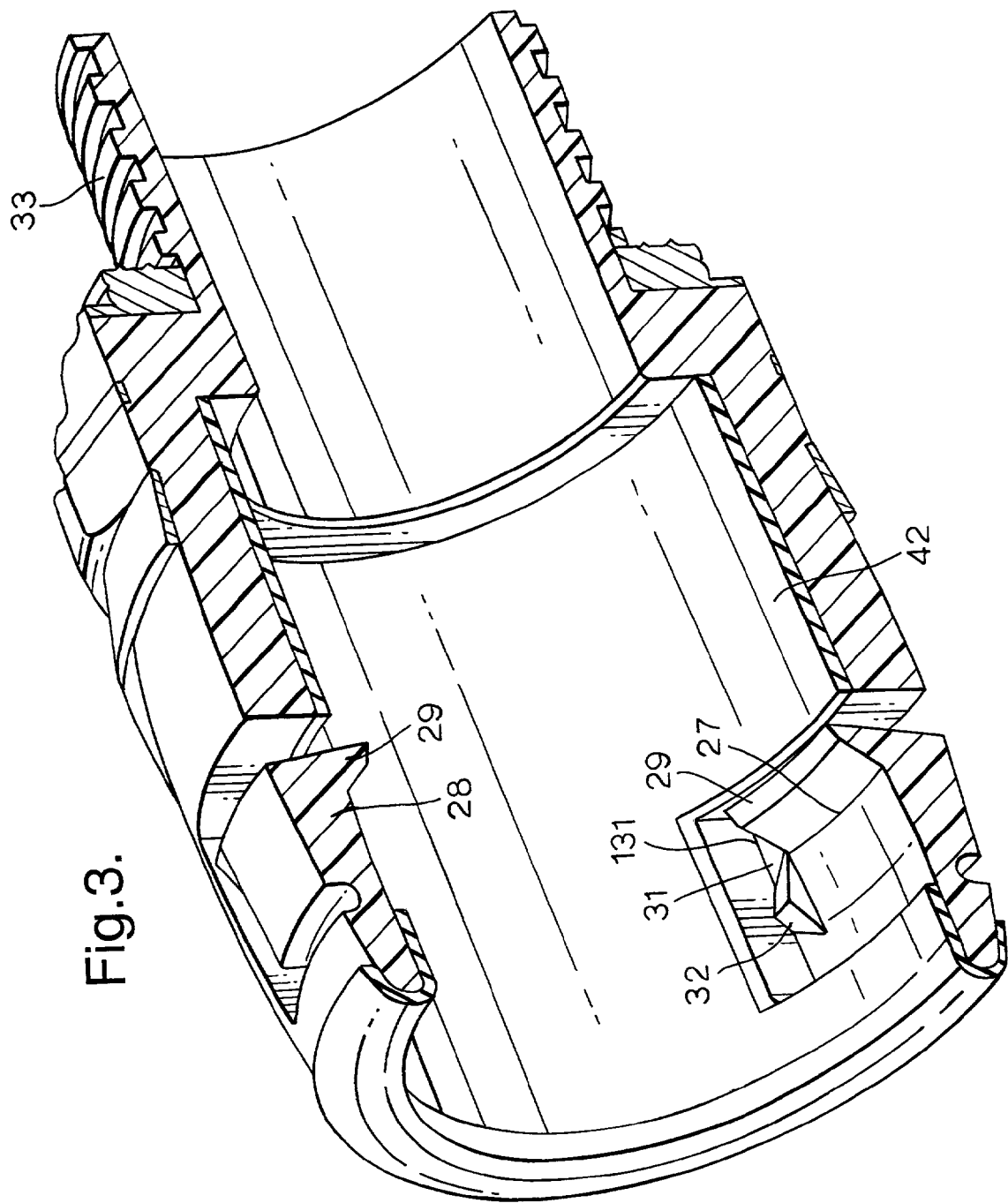
FIG. 3 is a perspective, cut-away view showing the inside of the coupling.

The coupling 2 comprises two parts joined with one another, namely a body or housing 20 and a layer 21. The housing 20 is similar to previous housings, being a single-piece of a rigid plastics material of substantially tubular shape. The housing 20 has a bore 22 extending axially along its length and divided by a shoulder 23 into two portions, namely an entrance portion 24 and an exit portion 25. The rear entrance portion 24 at the right-hand end of the housing 20 receives the end of the conduit 1 and a tapers slightly along its length. The forward, exit portion 25 has a reduced constant diameter. Towards its right-hand end, the housing 20 is formed with retaining means in the form of two retaining or locking arms or catches 27 and 28 each having an inwardly-extending tooth 29 at its free, left-hand end extending across the central region of the arms. The coupling could have any number of one or more locking arms. The right-hand end of each arm 27 and 28 is attached integrally with the housing 20 by a hinge portion 30 of reduced thickness, which enables the arms to be flexed resiliently outwardly. Each arm 27 and 28 has two opposite side regions 31, which are formed with a shallow ramp 32 of triangular section just rearwardly of the teeth 29. The purpose of the ramps 32 is to aid removal of the coupling from its tool in the manner described in GB 2225550. The side regions 31 project to the left forwardly beyond the teeth 29 a short distance to form stops 131. The purpose of these stops 131 is to engage the outside of the conduit 1 when the arms 27 and 28 are deflected inwardly as a result of a high force applied to pull the conduit out of the coupling 2. The stops 131 limit how far the arms 27 and 28 can be pulled in and, therefore, reduce the risk of damage to the arms. The natural position of the locking arms 27 and 28 is with their teeth 29 projecting slightly into the bore 22, as shown in FIGS. 2 and 3.

The forward, left-hand end of the housing 20 has an external screw thread 33 by which the coupling 2 can be screwed into a cooperating female coupling (not shown). Instead of a screw thread, the housing could have other forms of fixing formation, such as barbs or spring catches. Externally, the housing 20 has a forwardly-facing face or ledge 40 at the location of the inner shoulder 23.

The layer 21 is of a deformable, resilient thermoplastics material, preferably an elastomer. The layer 21 covers the entire tapered inner surface of the entrance portion 24, the right-hand end face 41 of the housing 20 and other parts of the outer surface of the housing.

That part of the layer 21 on the inside of the housing 20 provides an elastomeric seal 42 with the outside of the conduit 1. The dimensions of the housing 20, angle of taper and thickness of the layer 21 are such that the effective diameter of the bore 22 at the right-hand end is slightly greater than the external diameter of the conduit 1 and, at its left-hand end, is slightly smaller than the external diameter of the conduit. This arrangement is such that the end 10 of the conduit 1 can be pushed into the entrance portion 24 of the bore 22 but is prevented by contact with the tapering surface from contacting the shoulder 23. In this way, the seal 42 is compressed slightly into a tight sealing contact with the outside of the conduit 1 at its forward end 10.

An outer region 43 on one side of the housing 20 towards its left-hand end is covered by the layer 21 and is of a generally tulip shape. There is a corresponding region on the opposite side of the housing. These parts of the layer 21 provide manual gripping regions 43 to enable the coupling 2 to be held more securely by the hand. The layer 21 also provides an annular flange 44 on the external ledge 40, which has two concentric sealing ribs 144. The flange 44 and tulip-shape area 43 are continuous with one another via a stem portion 45. The flange 44 provides a washer or seal with the end of a cooperating coupling (not shown) screwed onto the threaded portion 33. Alternatively, the flange 44 may seal against the face of a panel around an opening through which the coupling extends. This flange portion 44 can be omitted or provided by a separate component.

Preferably, the layer 21 is formed using a two-shot injection moulding process so that the seal is formed by the same machine that moulds the housing 20. The housing 20 is on one core pin, which is then removed and a smaller diameter core pin is used to the internal elastomeric layer, between the outside of the second core pin and the inside of the housing. The elastomeric material can be injected into the from the right-hand end of the housing so that it flows over both the inner surface and over the outer regions 43 and 45 into the flange portion 44, as one continuous layer. It will be appreciated, however, that material to form the inner and outer layers could be injected separately. Because the seal part 42 is moulded into the housing 20, it is securely bonded with it and forms an effective seal with the inside of the housing.

In use, the coupling 2 is provided as a single component. The user simply pushes the forward end 10 of the conduit 1 into the rear end of the housing 20, so that the teeth 29 on the locking arms 27 and 28 ride over corrugations 11 on the conduit. The forward end 10 of the conduit 1 deforms the seal 42 outwardly slightly as it is pushed into the entrance portion 24. Rearward movement of the conduit 1 is prevented by the locking arms 27 and 28, which engage the conduit more tightly as force is applied to separate the conduit and coupling. The conduit 1 holds the material of the seal part 42 compressed between the outside of the conduit and the inside of the housing 20 to provide an effective seal.

This arrangement enables both an effective seal and external gripping regions to be provided without the need for separate components or separate assembly operations.

It will be appreciated that the structure is not limited to use with conduits but could be used on other forms of pipe. Alternative locking means could be used, such as with uncorrugated pipes. The retaining means could be provided by a separate component.

I claim:

1. A coupling for a pipe comprising:
   a housing of a relatively rigid plastics material having a central bore, an outer surface, an inner surface tapered substantially along its entire length, and an external ledge adjoining said outer and inner surfaces;
   one or more retaining members each comprising a retaining surface that is tapered substantially along its entire length for retaining a pipe within said housing when the pipe is pushed into the housing; and
   a continuous layer of a relatively deformable material, distinct from the retaining members, disposed on at least a part of the inner surface, the external ledge, and at least a part of the outer surface of said housing such that said continuous layer 1) deforms along the tapered inner surface against an outside of any pipe within a size range that is inserted into the housing to form a diametrical sealing engagement and 2) has a part formed on said outer surface of said housing to provide a seal with a cooperating member.

2. The coupling according to claim 1, wherein said continuous layer on said inner surface provides additional tapering along said inner surface.

3. The coupling according to claim 1, wherein said retaining members are formed integrally with said housing.

4. The coupling according to claim 1, wherein said retaining members each includes at least one resilient catch member adapted to engage projections on a pipe that is inserted into the housing.

5. The coupling according to claim 4, wherein each of said catch members is adapted to engage between corrugations of a corrugated pipe.

6. The coupling according to claim 1, wherein said continuous layer includes a part that provides a manual gripping region on said outer surface.

7. The coupling according to claim 1, wherein said deformable material is an elastomeric material.

8. A coupling for connecting one end of a corrugated pipe to a cooperating member comprising:
   a rigid housing of tubular construction having a central bore, an outer surface, an inner surface tapered substantially along its entire length and two resilient spring catches on opposite sides that engage between corrugations on an outside of a pipe within a size range when the pipe is pushed within at least a portion of the central bore of the coupling; and
   a continuous layer of a deformable material, distinct from said resilient spring catches and continuously joined with at least the tapered inner surface and at least a portion of the outer surface of said housing to form an internal, tapering sealing surface which deforms against and forms a seal with the cooperating member, and wherein said continuous layer includes a part formed on said outer surface of said housing on an external ledge of said housing to provide a seal with a cooperating member.

9. The coupling according to claim 8, wherein said layer includes a part that provides a manual gripping region on said outer surface.

10. An assembly comprising a corrugated pipe and a coupling comprising:
    a housing of a relatively rigid plastics material, said housing having a central bore, an outer surface and an inner surface tapered substantially along its entire length; retaining means retaining said pipe within said housing when the pipe is pushed within the central bore coupling; and
    a layer of a relatively deformable material distinct from the retaining means and molded onto at least a part of both the tapered inner surface and the outer surface of said housing, wherein said layer provides additional tapering on said inner surface to allow deformation against an outside surface diameter of a range of sizes of said pipe in said central bore, and thereby forms a diametrical seal with the outside surface of said pipe, wherein said layer includes a part formed on said outer surface on an external ledge of said housing to provide a seal with a cooperating member, and wherein said layer is continuous between said inner and outer surfaces.

11. The assembly according to claim 10, wherein said retaining means includes at least one resilient catch member adapted to engage a projection on said pipe.

12. A method of forming a coupling comprising:
   injecting a first material of a relatively hard plastics material to form a housing of said coupling with a central bore, an outer surface, an inner surface that is tapered substantially along its entire length and an integral retainer; and
   subsequently injecting a second, softer, deformable material to form a continuous layer on said harder material on the tapered inner surface and at least a portion of the outer surface of said housing, wherein said deformable material is distinct from said integral retainer, and wherein said layer forms a further tapered surface on said inner surface of said housing and surrounds said integral retainer and deforms into sealing engagement with an outside of a pipe when the pipe is pushed into the housing, wherein said layer includes a part formed on said outer surface of said housing on an external ledge of said housing to provide a seal with a cooperating member, and wherein said layer is continuous between said inner and said outer surfaces of said housing.

13. The method according to claim 12, wherein said retainer includes at least one resilient catch member to engage a projection on said pipe.

* * * * *